US005437897A

United States Patent [19]

Tanaka et al.

[11] Patent Number: 5,437,897

[45] Date of Patent: Aug. 1, 1995

[54] ANTI-COUNTERFEIT LATENT IMAGE FORMATION OBJECT FOR BILLS, CREDIT CARDS, ETC. AND METHOD FOR MAKING THE SAME

[75] Inventors: Toshinori Tanaka, Tokyo; Satoru Nishiyama, Odawara; Masaharu Koyama, Tokyo, all of Japan

[73] Assignee: Director-General, Printing Bureau, Ministry of Finance, Japan, Tokyo, Japan

[21] Appl. No.: 62,796

[22] Filed: May 18, 1993

[30] Foreign Application Priority Data

Jun. 4, 1992 [JP] Japan .................................. 4-168252

[51] Int. Cl.$^6$ .................................................. B32B 9/00

[52] U.S. Cl. ........................................ 428/29; 428/30; 428/915; 428/916; 428/195; 101/150

[58] Field of Search ................. 428/195, 915, 916, 29, 428/30

[56] References Cited

U.S. PATENT DOCUMENTS

| | | | |
|---|---|---|---|
| 4,033,059 | 7/1977 | Hutton et al. | 40/137 |
| 4,250,217 | 2/1981 | Greenaway | 428/916 |
| 4,522,670 | 6/1985 | Caines | 428/916 |
| 4,564,409 | 1/1986 | Kuhl | 428/916 |
| 5,246,785 | 9/1993 | Matano et al. | 428/195 |
| 5,298,310 | 3/1994 | Havens | 428/915 |

FOREIGN PATENT DOCUMENTS

| | | |
|---|---|---|
| 1019012 | 11/1977 | Canada . |
| 0194042 | 9/1986 | European Pat. Off. . |
| 53-98829 | 8/1978 | Japan . |
| 55-45400 | 11/1980 | Japan . |
| WO90/02658 | 3/1990 | WIPO . |

*Primary Examiner*—Patrick J. Ryan
*Assistant Examiner*—Kam F. Lee
*Attorney, Agent, or Firm*—Larson & Taylor

[57] ABSTRACT

An anti-counterfeit latent image formation object for bills, bank notes, security papers, credit cards, passports, valuable printing matters, and the like comprising a main body, a plurality projections and recesses means formed on the main body in such a manner as to exhibit various kinds of patterns, in which the various kinds of patterns comprise straight image lines forming a pattern, a relief pattern, or a combination of the pattern and the relief pattern; a plurality of straight lines printed on an upper surface of the projections and recesses at predetermined spaces, the straight lines being printed in different colors from that of the main body itself. The patterns consisting of letters, figures, etc. can be visually recognized only when the anti-counterfeit latent image formation object is viewed from an adequate angle. A method for making the anti-counterfeit latent image formation object is also disclosed.

12 Claims, 2 Drawing Sheets

ANTI-COUNTERFEIT LATENT IMAGE FORMATION OBJECT FOR BILLS, CREDIT CARDS, ETC. AND METHOD FOR MAKING THE SAME

BACKGROUND OF THE INVENTION

This invention relates to a latent image formation object for preventing valuable printing matters such as bills (paper money), bank notes, security papers, credit cards, passports, etc. from being counterfeited or falsified, and a method for making the same.

In general, valuable matters such as bills, security papers, credit cards, passports, etc. are required such that they are very difficult to be counterfeited or falsified. In order to meet with this requirement, many attempts have heretofore been made. In a typical technique, a watermark is formed in such sheets of paper. In another attempt, a distinctive substance (security thread, colored fiber, etc.) is inserted into such sheets of paper. There is also a technique in which such sheets of paper are provided with many projections and recesses (irregularities) on surfaces thereof.

However, those watermarked sheets of paper have such shortcomings that it is difficult to visually recognize the watermarked pattern unless the sheets of paper are looked through carefully. Moreover, it is possible to imitate the watermark by the printing using vanish, etc. Therefore, this watermark technique cannot be a perfect anti-counterfeit means at present.

SUMMARY OF THE INVENTION

This invention relates to a latent image formation object for preventing valuable printing matters such as bills (paper money), bank notes, security papers, credit cards, passports, etc. from being counterfeited and/or falsified, and a method for making the same.

From one aspect of the present invention, there is essentially provided an anti-counterfeit latent image formation object for bills, bank notes, security papers, credit cards, passports, valuable printing matters, and the like comprising a main body, projections and recesses means formed on said main body in such a manner as to exhibit various kinds of patterns, in which said various kinds of patterns comprise straight image lines forming a pattern, a relief pattern, or a combination of said pattern and said relief pattern, a plurality of straight lines printed on an upper surface of said projections and recesses means at predetermined spaces, said straight lines being printed in different colors from that of said main body itself.

From another aspect of the present invention, there is also provided a method for making an anti-counterfeit latent image formation object for bills, bank notes, security papers, credit cards, passports, valuable printing matters, and the like comprising a main body, projections and recesses means formed on said main body in such a manner as to exhibit various kinds of patterns, in which said various kinds of patterns comprise straight image lines forming a pattern, a relief pattern, or a combination of said pattern and said relief pattern, a plurality of straight lines printed on an upper surface of said projections and recesses means at predetermined spaces, said straight lines being printed in different colors from that of said main body itself.

In the case where tile various kinds of patterns comprising a pattern, a relief pattern, or a combination of the pattern and the relief pattern are various kinds of patterns comprising a wavy pattern, a wavy relief pattern, or a combination of the wavy pattern and the wavy relief pattern, the straight lines having predetermined spaces, which are to be applied thereto, become wavy lines having predetermined spaces.

It is therefore an object of the present invention to provide an anti-counterfeited product, in which bills, bank notes, security papers, credit cards, passports, etc. (for which publicity and reliability are required) are fully applied with anti-counterfeit and anti-falsification means.

Another object of the present invention is to provide an anti-counterfeit product, which is difficult to counterfeit by a color copying machine or a photomechanical process.

A further object of the present invention is to provide a process for making such products as bills, bank notes, security papers, credit cards, passports, and other valuable printing matters which are required to have means for preventing counterfeit and falsification.

These objects can be achieved by a constitution of an anti-counterfeit latent image formation object as well as a method for making tile same, constituting the present invention. Specific embodiments of the invention are exemplified in the accompanying drawings and the detailed description to follow. It is to be understood that minor rectifications and modifications of these embodiments are also included in the scope of the appended claims.

BRIEF DESCRIPTION OF THE DRAWINGS

FIG. 1(*b*) is a view showing straight lines;

FIG. 1(*c*) is a view showing a relief pattern;

FIG. 3(*b*) is a partly enlarged view of a part $\alpha$ of FIG. 3(*a*);

DETAILED DESCRIPTION OF THE EMBODIMENTS

Figure 2:
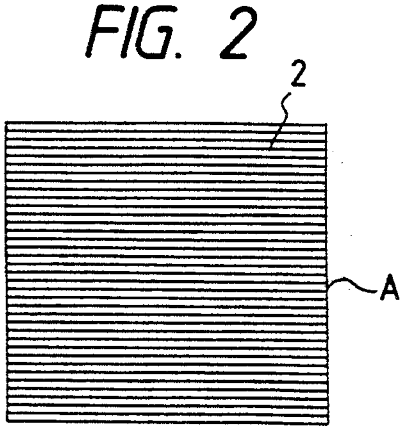
FIG. 2 is a view of a latent image formation object, when viewed in a direction perpendicular to a paper surface, according to one embodiment of the present invention.
Figure 4:
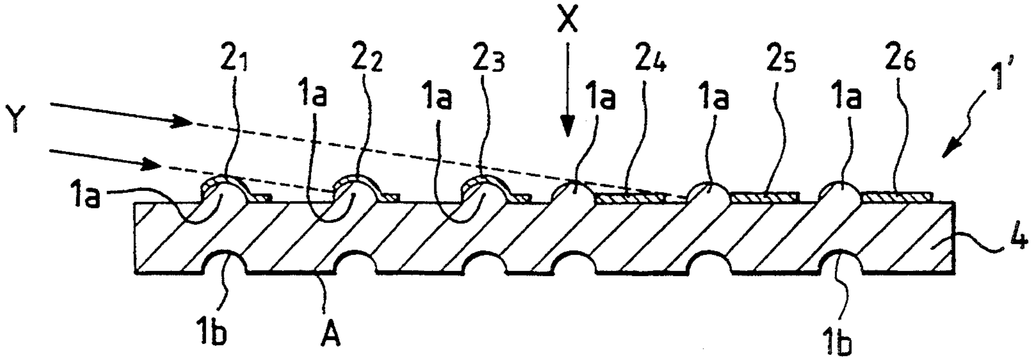
FIG. 4 is an explanatory view of an enlarged schematic section taken on line x—x' of FIG. 3(*a*)

Referring to FIGS. 2 and 4, a latent image formation object (A) is made as follows.

The expression "latent image formation object" herein used refers to either a sheet-like substance or a short-piece like substance having hidden patterns and proposed for the first time in this invention. In the anti-counterfeit latent image formation object of this invention, the letters and/or figures existing as a latent image can be visually recognized only when the object is viewed at an adequate angle.

Figure 1A:
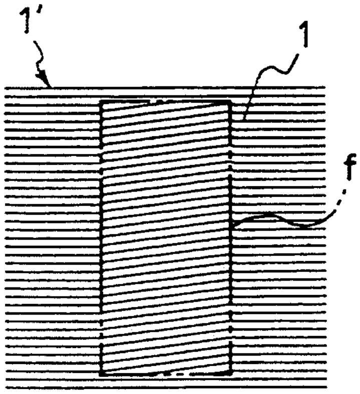
FIG. 1(*a*) is a view showing straight image lines forming a pattern by drawing tile straight image lines partly at different angles.
Figure 1B:
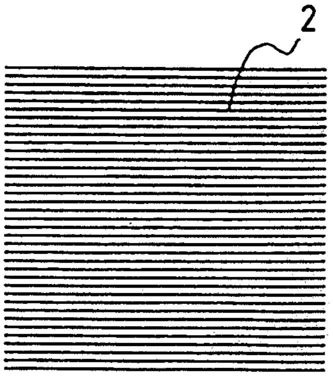
Figure 1C:
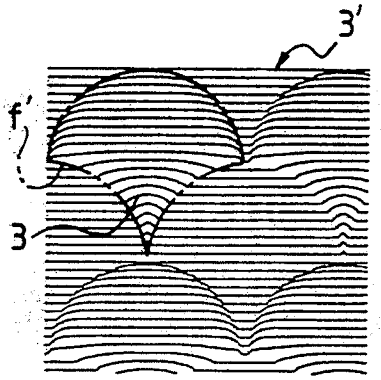

First, as shown in FIG. 1(*a*), straight image lines (1) are changed in angle at their predetermined locations to form a pattern (1'). In this example, the straight image lines (1) are changed in angle at their central portions within a rectangular figure (f) as indicated by imaginary lines. In a modified form, the figure (f) is expressed by letters, or a combination of letters and figures. An embossing plate (interglio plate or engraving plate) is made utilizing this pattern (1') [50 straight image lines are used per inch, and the line area is 50%].

The paper is embossed by this plate. As shown in FIG. 4, projections (1*a*) are formed on an upper surface of the embossed paper (4), and recesses (1*b*) are formed in a lower surface of the paper.

Then, straight lines (2) shown in FIG. 2 are printed on this embossed paper (4). At this time, there are 50 straight lines (2) per inch. The line area may be any value within a range of about 10% to 80%, and preferably about 30%. This range (i.e., about 10% to 80%) of the line area of the straight lines (2) is also applicable to other embodiments which will be described later.

Printing of the straight lines (2) is made onto the paper (4) using ink of a different color from that of the embossed paper (4). A printing method here may be a conventional one, and an offset printing is usually employed. The printing is made such that the projections (1*a*) and the straight lines (2) are parallel in parallel relation. At this time, those portions of the straight image lines (1) changed in angle, i.e., the figure (f) portion, are not in parallel relation.

It is preferable the most that the projections (1*a*) and the straight lines (2) are in parallel positional relation. However, even when they are in slightly angled relation and even when halftone dots are used instead of the straight lines (2), there can be obtained the effect in that a latent image appears as will be described later.

When viewed in an adequate direction, a latent image [the figure (f) in the case of FIG. 1(*a*)] in the printed matter thus made, i.e., the latent image formation object (A). The principle of appearance of the latent image will be described hereinafter.

FIG. 2 shows a view of the latent image formation object (A) when viewed in a direction perpendicular to the paper surface of the embossed paper (4). At this time, only the printed straight lines (2) are seen.

Figure 3A:
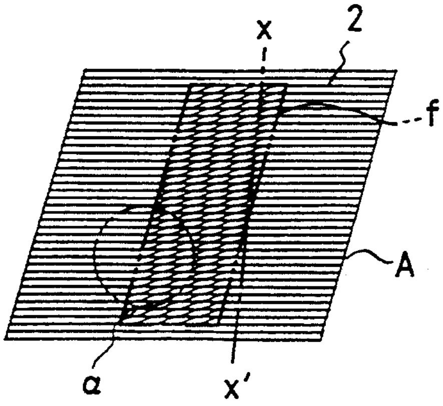
FIG. 3(*a*) is a view of the latent image formation object of FIG. 2, when viewed in a direction right angle to the straight lines and slant to the paper surface.
Figure 3B:
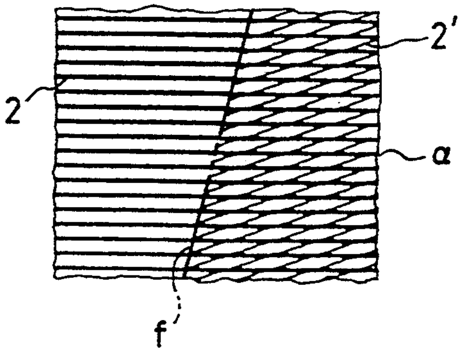

FIG. 3(*a*) is a view schematically showing this latent image formation object (A) when viewed in a direction slant to the paper surface and perpendicular to the straight lines (2). In this condition, a similar phenomenon to a phenomenon for producing a moire fringe pattern is taken place by interaction as later described between the straight lines (2) and the projections (1*a*) formed in the same way as the straight image lines (1), and as a result, the figure (f) looks like a -fringe pattern. The figure (f), i.e., the latent image, which is invisible when viewed in the direction perpendicular to the paper surface as in FIG. 2, becomes visible when viewed in the direction slant to the paper surface and right angle to the straight lines (2).

A portion (2') where the straight lines (2) are intersected in a right-hand area of FIG. 3(*b*) is a view schematically showing a generation of a similar fringe pattern to the above-mentioned moire fringe pattern. Such generation of the similar fringe pattern to the moire fringe pattern is just like a phenomenon which is seen when the straight lines (2) and the straight image lines (1) are superimposed. Although the usual moire fringe pattern is visible even when viewed in any direction, the similar fringe pattern of the present invention to the moire fringe pattern is invisible when viewed in the perpendicular direction to the paper surface because the straight image lines (1) are the projections (1*a*) formed by embossing.

Next, the interaction between the straight lines (2) and the projections (1*a*) will be described with reference to FIG. 4. FIG. 4 is an enlarged sectional view of the latent image formation object (A) taken on line x—x' of FIG. 3(*a*).

There exist the projections (1*a*) and the recesses (1*b*) on the embossed paper (4). The straight lines (2) [shown in more detail as straight lines ($2_1$) to ($2_6$) in FIG. 4] are printed on that surface of the embossed paper (4) where the projections (1*a*) exist. A relative positional relation between the straight lines (2) and the projections (1*a*) formed by the straight image lines (1) is the same at an area other than the figure (f) where the straight image lines (1) are changed in angle as shown in FIG. 1(*a*), but it is different at the area where the straight image lines are changed in angle, i.e., the figure (f) portion. In other words, as shown in FIG. 4, the straight lines ($2_1$) to ($2_3$) and the straight lines ($2_4$) to ($2_6$) are different in position relative to the projections (1*a*).

When such latent image formation object (A) is viewed in the direction perpendicular to the paper surface, i.e., in an X-direction of FIG. 4, the straight lines ($2_1$) to ($2_6$) are seen as having the same width irrespective of their positions relative to the projections (1*a*). On the other hand, when the latent image formation object (A) is viewed in a Y-direction of FIG. 4, the straight lines ($2_4$) to ($2_6$) can hardly be seen because they are hidden behind the respective projections (1*a*). On the contrary, the straight lines ($2_1$) to ($2_3$) are hidden only at their very small portions by the respective projections (1*a*). A difference between the view in the Y-direction under the influence of the projections (1*a*) and the view in the X-direction likewise under the projections (1*a*) causes a generation of the latent image.

When there exist the straight lines (2) and the straight image lines (1) as in the latent image formation object (A), the straight lines having different angles exhibit the similar fringe pattern to the moire fringe pattern at the figure (f) portion.

Even if printing is made by the halftone dots instead of the straight lines (2), the similar latent image to the above-mentioned one can be obtained. In this case, the latent image appears when the lines of the halftone dots are 50 per inch and the dot area is 10% to 80%. This dot area is preferably 30% to 50%. In the example of FIG. 4, although the straight lines ($2_1$) to ($2_6$) are printed on the projections (1*a*) side of the paper (4), a similar latent image appears even if the straight lines ($2_1$) to ($2_6$) are printed on the recesses (1*b*) side reverse to the projections (1*a*) side.

Besides the paper, a metal plate, a synthetic resin sheet and the like may be used as the object to be printed (object to be embossed). The object to be printed is not limited to the paper, etc., as long as printing can be made thereon, and projections and recesses in the form of the straight image lines (1) can be formed on its upper surface.

In the first embodiment of FIG. 1(*a*), a comparatively simple rectangular figure (f) is used as a latent image. In order to express a high degree of a latent image, however, a relief pattern (3′) formed by relief image lines (3)[a figure expressing a three-dimensional feeling by partly changing a distance between parallel relief image lines (3). In the Illustrated example, 50 lines per inch and 50% of the line area.]is used as shown in FIG. 1(*c*). In this example of FIG. 1(*c*), the respective relief image lines (3) are raised upwardly one after another at the figure (f′) portion. By such change in position of the relief image lines (3), a relative position with the projections (1*a*) is changed to provide a more complicated latent image.

In a modified form, the latent image formation object (B) is made as follows. That is, the embossed paper (4) is embossed (see FIG. 6) by means of an intaglio plate (or engraving plate) consisting of a relief pattern (3′), and the straight lines (2) are printed by ink having other colors than embossed paper (4), on the upper surface of the embossed paper (4) at predetermined spaces in such a manner as to be in parallel relation with the projections (1*a*) by suitable means such as offset printing.

Figure 5:
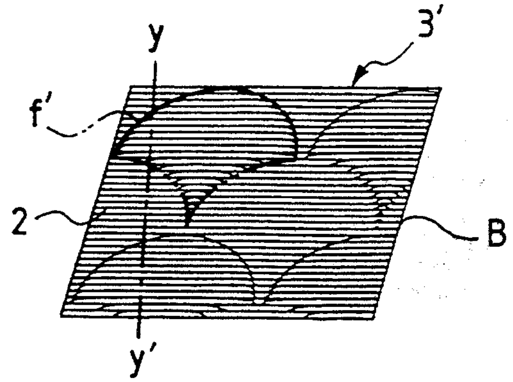
FIG. 5 is a view of a latent image formation object according to another embodiment of the present invention, when viewed in a direction right angle to the straight lines and slant to the paper surface.

In the view where this latent image formation object (B) is viewed in a direction perpendicular to the paper surface, it is only the printed straight lines (2) that can be seen as in FIG. 2. FIG. 5 is a view of the latent image formation object (B) when viewed in a direction right angle to the straight lines (2) and slant to the paper surface. That is, when this latent image formation object (B) is viewed in the direction perpendicular to the paper surface, it is only the straight lines (2) that can be seen. However, when the latent image formation object (B) is viewed in the slant direction, the relief pattern (3′) can be observed very easily. When it is viewed in a slant direction but from the opposite side, the brightness and darkness of the relief pattern (3′) are viewed in an inverted manner.

Figure 6:
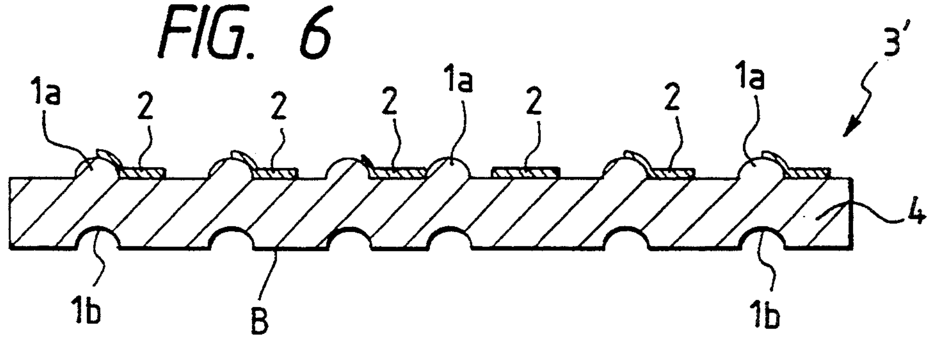
FIG. 6 is an explanatory view showing an enlarged schematic sectional view taken on line y—y' of FIG. 5.

FIG. 6 is an explanatory view of an enlarged section taken on line y—y′of the latent image formation object (B) of FIG. 5. In FIG. 6, the embossed paper (4) is provided with the embossed relief pattern (3′), and the straight lines (2) are printed on the upper surface of the embossed paper (4).

Furthermore, even if these straight lines (2) are replaced by halftone dots, the relief pattern (3′) can be visually recognized with ease. In FIG. 6, although the straight lines (2) are printed on the upper surface of the embossed projection (1*a*) side, a similar latent image formation object (B) can be obtained when the straight lines (2) are printed on the embossed recess side formed on the under surface of the embossed paper (4). Other materials than the paper may be used, such as a thin metal plate, a thin synthetic resin sheet, etc. In this case, similar projections and recesses are formed on the metal plate, etc.

Figure 7:
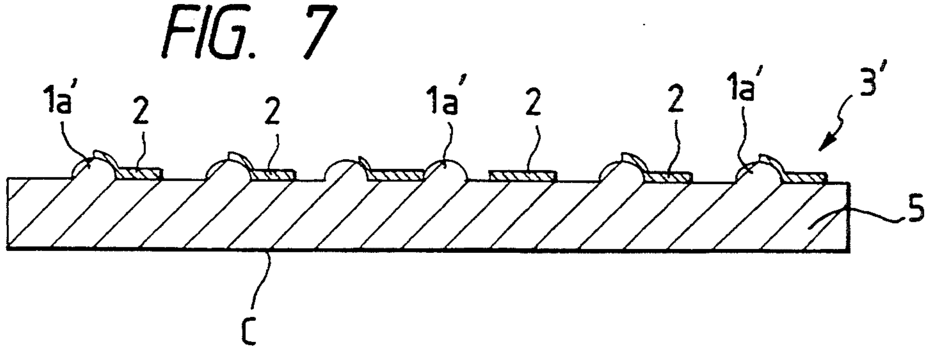
FIG. 7 is an explanatory view showing a schematic sectional view of a latent image formation object according to a further embodiment of the present invention.

When the relief pattern (3′) as shown in FIG. 1(*c*) is formed by watermark method, a watermarked paper (5) only having projections (1*a*′) but not having recesses [see FIG. 7], the straight lines (2) [or halftone dots] consisting of straight lines arranged at predetermined spaces are printed, in colored ink [other than the color of the watermarked paper (5) and transparent], on the upper surface of the projections (1*a*′) in such a manner as to be in parallel relation with the relief pattern (3′) by suitable means such as offset printing to form a latent image formation object (C).

When this latent image formation object (C) is viewed in the direction perpendicular to the paper surface, it is only the straight lines (2) that can be seen. However, when the latent image formation object (C) is viewed in the direction right angle to the straight lines (2) and slant to the paper surface, the relief pattern (3′) can be observed very easily. When it is viewed in a slant direction but from the opposite side, the brightness and darkness of the relief pattern (3′) are viewed in an inverted manner.

FIG. 7 is an explanatory view of an enlarged section (same portion as FIG. 5 on line y—y′) of the latent image formation object (C), in which the watermarked paper (5) is provided with the projections (1*a*′) of the relief pattern (3′), and the straight lines (2) are printed on an upper surface thereof.

Instead of the above pattern (1′) formed by the straight image lines (1), a wavy pattern may be formed by wavy image lines.

Instead of the relief pattern (3′) formed by the relief image lines (3), a wavy relief pattern may be formed by the wavy relief image lines.

In the case where the various kinds of patterns comprising the wavy pattern or the wavy relief pattern use a material formed by the projections and recesses, there can be obtained the invented latent image formation object having the same functions and effects by printing the wavy lines at predetermined spaces on the projections and recesses using ink having a different color from that of the material itself.

When the present invention is applied to printing matters for which publicity and reliability are required, such as bills, bank notes, security papers, credit cards, passports and the like, it can be easily Judged whether or not the bills, etc. are counterfeit notes because letters and figures can be visually recognized by observation from an adequate direction. Therefore, the bills, etc. incorporated with the present invention are very difficult to be counterfeited and/or falsified. In other words, it is impossible to extract the projections and recesses formed on the products of the present invention so as to be copied, by using a color copying machine or a photomechanical process which are currently available. Therefore, the latent image cannot be reproduced. It is only the colored printed image lines that can be copied, and therefore, the bills, etc. incorporated with the present invention cannot be counterfeited.

The latent image formation object (C) of FIG. 7, which is made by means of watermarking, are particularly usefully applied to valuable products which are manufactured by mass production, such as bills, bank notes and the like.

The present invention is likewise applicable to other valuable printing matters for which anti-counterfeit and anti-falsification are required.

What is claimed is:

1. A latent image formation object for printed matter comprising:

a main body;

projections or recesses formed on said main body in such a manner as to exhibit various kinds of patterns, in which said various kinds of patterns comprise straight image lines forming a pattern, a relief pattern or a combination of said pattern and said relief pattern; and a plurality of straight lines printed on at least one surface of said main body at predetermined spaces, said straight lines being printed in colors different from that of said main body itself, wherein the relative positional relationship between said projections or recesses is non-uniform.

2. A latent image formation object for printed matter comprising:

a main body;

projections or recesses formed on said main body in such a manner as to exhibit various kinds of patterns, in which said various kinds of patterns comprise wavy image lines forming a wavy pattern, a wavy relief pattern, or a combination of said wavy pattern and said wavy relief pattern; and a plurality of wavy lines printed on at least one surface of said main body at predetermined spaces, said wavy lines being printed in different colors from that of said main body itself, wherein the relative positional relationship between said projections or recesses is non-uniform.

3. A latent image formation object as claimed in claim 1, in which said body is formed of paper, metal, synthetic resin, or watermarked paper.

4. A latent image formation object as claimed in claim 1, in which said straight lines arranged at predetermined spaces comprise their halftone dots, or a combination of said straight lines and said their halftone dots.

5. A latent image formation object as claimed in claim 2, in which said body is formed of paper, metal, synthetic resin, or watermarked paper.

6. A latent image formation object as claimed in claim 2, in which said wavy lines arranged at predetermined spaced comprise their halftone dots, or a combination of said wavy lines and said their halftone dots.

7. A latent image formation object as claimed in claim 1, wherein said printed matter comprises at least one of bills, bank notes, security papers, credit cards, passports, and valuable printing matters.

8. A latent image formation object as claimed in claim 2, wherein said printed matter comprises at least one of bills, bank notes, security papers, credit cards, passports, and valuable printing matters.

9. A latent image formation object as claimed in claim 1, wherein the combination of said relative positional relationship between said projections or recesses, and said evenly spaced straight lines printed on the main body comprises a pattern, a relief pattern or a combination of said pattern and said relief pattern which cannot be seen when viewed at a viewing direction perpendicular to said main body, having one tone when viewed in one direction off of said perpendicular viewing direction, and having an opposite tone when viewed in a direction opposite said one direction from said perpendicular viewing direction.

10. A latent image formation object as claimed in claim 2, wherein the combination of said relative positional relationship between said projections or recesses and said wavy lines printed on the main body comprises a wavy pattern, a wavy relief pattern or a combination of said wavy pattern and said wavy relief pattern which cannot be seen when viewed at a viewing direction perpendicular to said main body, having one tone when viewed in one direction off a viewing direction to said main body and having an opposite tone when viewed in a direction opposite said one direction from said perpendicular viewing direction.

11. A latent image formation object as claimed in claim 1, wherein said straight lines are evenly spaced.

12. A latent image formation object as claimed in claim 2, wherein said wavy lines are evenly spaced.

* * * * *